US006689429B2

(12) United States Patent
Simons

(10) Patent No.: US 6,689,429 B2
(45) Date of Patent: Feb. 10, 2004

(54) COATING FLUID FOR THE PREPARATION OF A RECORDING MEDIUM FOR USE IN INKJET PRINTING

(75) Inventor: Michael J. Simons, Middlesex (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/981,375

(22) Filed: Oct. 16, 2001

(65) Prior Publication Data
US 2002/0081442 A1 Jun. 27, 2002

(30) Foreign Application Priority Data
Dec. 23, 2000 (GB) .............................. 0031678

(51) Int. Cl.$^7$ ................................. B41M 5/00
(52) U.S. Cl. ............................. 428/32.29; 428/32.34; 428/32.36; 524/492; 524/430; 524/556
(58) Field of Search ................... 428/195, 329, 428/331, 411.1, 32.29, 32.34, 32.36; 524/492, 430, 556

(56) References Cited

U.S. PATENT DOCUMENTS

| 6,132,878 | A  | * | 10/2000 | Kojima et al. ........... 428/411.1 |
| 6,242,082 | B1 | * | 6/2001  | Mukoyoshi et al. ........ 428/212 |
| 6,245,422 | B1 | * | 6/2001  | Onishi et al. ............... 428/331 |
| 6,352,341 | B2 | * | 3/2002  | Kovacs et al. .............. 347/101 |
| 6,358,668 | B1 | * | 3/2002  | Leenders et al. ......... 430/271.1 |
| 6,359,056 | B1 | * | 3/2002  | Aurenty et al. ............. 524/556 |
| 6,369,750 | B1 | * | 4/2002  | Altavilla ...................... 342/96 |
| 6,406,143 | B1 | * | 6/2002  | Chen et al. .................. 347/105 |

FOREIGN PATENT DOCUMENTS

EP   0 586 846 B1   10/1996

* cited by examiner

*Primary Examiner*—B. Hamilton Hess
*Assistant Examiner*—B. Shewareged
(74) *Attorney, Agent, or Firm*—Harold E. Cole; Chris P. Konkol

(57) ABSTRACT

A coating fluid for forming a coating on a support for use in printing comprises an aqueous liquid having dispersed therein (a) from 2 to 50% of an inorganic oxide selected from aluminum oxide and silica the % being by weight based on the combined weight of aqueous liquid and inorganic oxide and (b) from 1 to 50% by weight based on the weight of oxide (a) of a composition comprising a polymer containing negatively charged groups and a cationic surfactant.

The composition may be formed from a polymer containing maleic acid units and a surfactant containing a quaternary nitrogen atom. The polymer may be a copolymer obtained by copolymerizing a maleic acid containing monomer with another ethylenically unsaturated monomer or monomers and where the molar ratio of maleic acid containing monomers to other monomers is from 1:1 to 1:5.

10 Claims, No Drawings

COATING FLUID FOR THE PREPARATION OF A RECORDING MEDIUM FOR USE IN INKJET PRINTING

FIELD OF THE INVENTION

This invention relates to a coating fluid for the preparation of an ink absorbing recording medium for use in inkjet printing, to a method for the preparation of the coating fluid, to a an ink absorbing recording medium for use in ink jet printing and to a process for the preparation of the ink absorbing recording medium.

BACKGROUND OF THE INVENTION

In recent years reflecting the use of electronic still cameras and computers, the hard copy technology to record images on paper sheets has been rapidly developed. The goal is to bring the colour reproducibility, image density, gloss and weather resistance of the hard copy to the same level as silver halide photography. Ink jet systems have been used for hard copy recording since full colouring is easy and the printing noise is low. In an ink jet system ink droplets are ejected at high speed from nozzles to a recording material and the ink contains a large amount of solvent which is usually water.

The recording sheet for an inkjet printer is required to swiftly absorb the ink and have good colour forming properties. To reduce the dry time of the ink it has been previously proposed to provide a recording sheet having a porous layer formed on a substrate, the porous layer being formed of an inorganic oxides such as aluminium oxides or silica.

European Patent Application No 586 846 discloses an ink jet recording sheet having an ink receiving layer containing a cation modified non spherical colloidal silica. By non spherical is meant substantially non spherical and includes acicular and fibrous in shape. The cation modified silica may be prepared by coating the colloidal silica with a hydrous metal oxide such as aluminium oxide.

PROBLEM TO BE SOLVED BY THE INVENTION

The acicular and fibrous cation modified silica described in the above mentioned European Patent Application No 586846 are relatively expensive and there is an economic incentive to use a silica which has not been cation modified where possible.

Silica which has not been cation modified usually contains surface hydroxyl groups capable of releasing hydrogen ions and leaving a negative charge on the surface. Such silica is referred to in the present specification as anionic silica. In inkjet printing it is generally preferred to produce prints which are glossy rather than matte in appearance. However it is more difficult to obtain glossy prints from anionic silica than from cationic silica. Glossy products have been previously produced from anionic silica but this has often required the use special coating techniques such as cast coating.

The present invention provides a solution to this problem by providing a novel coating fluid comprising an anionic inorganic oxide selected from silica and alumina and a solution of a composition containing a cationic surfactant and a polymer containing negatively charged groups. Many of these novel coating fluids are able to produce a glossy print without the need of cast coating. Others of the novel coating fluids produce matte coatings which are nevertheless useful in many applications.

SUMMARY OF THE INVENTION

According to the present invention there is provided a coating fluid for forming a coating on a support for use in printing said fluid comprising an aqueous liquid having dispersed therein
(a) from 2 to 50% of an anionic inorganic oxide selected from aluminium oxide and silica the % being by weight based on the combined weight of aqueous liquid and inorganic oxide and
(b) from 1 to 50% by weight based on the weight of oxide (a) of a composition containing a polymer containing negatively charged groups and a cationic surfactant.

According to another aspect of the present invention there is provided a process for the preparation of a coated support for use in inkjet printing which process comprises applying to the support a coating fluid as hereinbefore defined and allowing the coating to dry.

According to a further aspect of the present invention there is provided a support having a coating formed from a coating fluid as hereinbefore defined.

ADVANTAGEOUS EFFECT OF THE INVENTION

The advantage of the present invention is that it provides coatings which can be used in inkjet printing to yield glossy prints without the need of special coating techniques.

DETAILED DESCRIPTION OF THE INVENTION

Although the coatings of the present invention are particularly suitable for use in ink jet printing, they may also be used in other printing applications e.g. as supercoats on photographic papers, or as part of a colour diffusion transfer receiver sheet.

Furthermore although glossy coatings are preferred, it is intended to include within the scope of the present invention matte coatings which have been prepared from the anionic inorganic oxide and composition containing anionic polymer and cationic surfactant as defined above.

The term cationic surfactant in the present specification is intended to include molecules which contain, in addition to a positively charged atom such as quaternary nitrogen, one or more hydrophobic groups such as butyl, pentyl, hexyl or heptyl.

The term therefore includes compounds such as tetrabutyl ammonium chloride which are not usually classified as surfactants.

The cationic surfactant should be one capable of forming water soluble complexes with maleic acid copolymers and may for example be one containing quaternary nitrogen for example quaternary ammonium or pyridinium for example cetyl trimethyl ammonium chloride, or cetyl pyridinium chloride.

Preferably the hydrophobic portion comprises a hydrocarbon group containing more than 4 carbon atoms, more preferably at least 8 carbon atoms although quaternary compounds bearing high proportions of hydrophobic groups, for example didodecyl dimethyl ammonium bromide may not form water-soluble complexes with maleic acid copolymers and so will not be suitable for use in the present invention. Benzyl tributyl ammonium chloride may also be used but it has been found that the product is not glossy. Coating fluids containing this surfactant are however particularly suitable for use in a lower layer of a recording medium.

Preferably the amount of inorganic oxide is from 3 to 30% by weight based on the combined weight of aqueous liquid and inorganic oxide and preferably the amount of complex is from 2 to 20% based on the weight of the inorganic oxide.

The liquid medium in which the inorganic oxide and polymer complex are dispersed may be water. It is possible to employ other solvents in addition to the water but it is preferred to employ water alone.

A binder polymer may also be included in the coating fluid although the coating fluids of the present invention do not require a binder polymer and it is preferred not to have one present. If one is employed, the binder polymer may be any of those known in the art. Such polymers include polyvinyl alcohol, polyvinyl pyrrolidone, polyvinyl acetate, copolymers of styrene and acrylates, copolymers of styrene and butadiene, polyacrylates and polymethacrylates, copolymers of acrylic and methacrylic acid, polyacylamides and polymethacrylamides.

The inorganic oxide should be dispersible in water and is preferably capable of forming a colloidal dispersion in water.

Preferably the inorganic oxide is silica.

The forms of silica and alumina suitable for use in the present invention are those having surface hydroxyl groups which are capable of releasing a hydrogen ion to leave a negative charge on the surface. These forms of silica and alumina are referred to in the present specification as anionic.

The silica may be one that is known in the art as monodisperse or polydisperse. When the inorganic oxide is aluminium oxide it usually comprises aluminium oxide hydrate particles. These are capable of being dispersed to form a colloidal dispersion in water.

The aluminium oxide is preferably fumed or colloidal since the particles are smaller (less than 100 nm) although other forms such as precipitated or gel may be used.

As the aluminium oxide hydrate one represented by the compositional formula $Al_2O_3.nH_2O$ where n is from 1 to 1.5 may be used. It is suitable as an ink receiving layer since the colourant is well absorbed and fixed to it. Aluminium oxide in the form of Bohemite or pseudo-Bohemite may be used. The latter is described in U.S. Pat. No. 5,104,730.

The polymer containing negatively charged groups hereafter referred to as the anionic polymer is preferably one containing carboxylic acid groups on two adjacent carbon atoms in the polymer chain with a spacer group provided by a comonomer separating pairs of carbon atoms bearing the carboxylic acid groups.

The anionic polymer conveniently has a molecular weight in the range from 5,000 to one million and is preferably a copolymer obtained by copolymerising a maleic acid containing monomer with another ethylenically unsaturated monomer or monomers and where the molar ratio of maleic acid containing monomers to other monomers is from 1:1 to 1:5.

The maleic acid may be provided by its esters or maleic anhydride. Examples of the other monomers are methyl vinyl ether, styrene, isobutylene, and acrylic acid.

The coating fluid may be prepared by mixing together aqueous solutions of polymer containing maleic acid units and cationic surfactant, stirring until any precipitate which may form has dissolved and then mixing the resultant solution with a colloidal silica dispersion.

The combined mixture is then coated on the support.

The relative amount of anionic polymer to cationic surfactant should be sufficient to maintain the composition in solution or where a precipitate is formed to redissolve the precipitate.

The relative quantities can vary with the structures of the cationic surfactant and maleic acid copolymer used, but generally it is found that a molar ratio of cationic surfactant to maleate ion units of between 2:100 to 1:1 is suitable that is the molar ratio of cationic surfactant to carboxylate or carboxylic acid units of between 1:100 to 1:2.

Suitable colloidal silica dispersions bear negative charges on the silica particles, and may be of relatively uniform particle size as in Ludox silicas available from Du Pont, or polydisperse as in Syton silicas from the same supplier. Suitable particle sizes for the colloidal silica range between 10 and 100 nanometers in diameter. In addition particles of diameter up to about 2 nanometers may be used although these may not be colloidal.

The quaternary salt-maleic copolymer complex is preferably present at between 1 and 20% of the silica present, expressed as dry weight.

Other substances may be included in the coating fluid for example other polymers, latexes, inorganic particles including aluminium oxides, clays and minerals and metal ions.

Sufficient microporous silica may be coated on a support to absorb all the ink applied by an ink jet printer. That requires an ink absorption capacity of approximately 10 to 20 ml per square meter that may require a silica coverage of about 50 g/square meter.

Alternatively the silica layer may be applied as a coating above or below another ink absorbent layer, for example water absorbent paper, or a layer of gelatin or other water absorbent polymer in which case lower silica coverages of between 1 and 20 g/square meter may be suitable.

It has been found that some of the coating fluids of the invention gel rapidly. Therefore according to one embodiment the method of coating is carried out by forming two streams, the first comprising the aqueous dispersion of inorganic oxide selected from silica and alumina, the second stream comprising an aqueous dispersion of the composition comprising polymer containing negatively charged groups and cationic surfactant, and mixing the two streams and immediately applying the mixture to the support.

The invention is illustrated by the following Examples.

EXAMPLE 1.

This Example is not according to the invention and is included for comparative purposes only.

To 3 g of Syton (Registered Trade Mark) W50 (colloidal silica dispersion, 50% wt silica, supplied by Du Pont) was added 4.8 g of water and 1.2 g of 5% w/w polyvinyl alcohol solution in water. The polyvinyl alcohol used was Elvanol (Registered Trade Mark) 71-30G supplied by Du Pont. The mixture was then stirred and then coated on polyethylene terephthalate photographic film support using a doctor blade positioned 150 micrometers above the surface of the film support. The coating was allowed to dry and was seen to be white, matte and opaque.

EXAMPLE 2

A 10% solution of poly(methyl vinyl ether-alt-maleic acid), sodium salt, was prepared by dissolving 100 g of poly(methyl vinyl ether-alt-maleic acid) (supplied by Aldrich Chemical Company Inc, molecular weight ca. 216,000) in approximately 750 g of water, adding 142 ml of 4 M sodium hydroxide and adjusting the final weight to 1000 g. The pH of the resulting solution, at 22° C., was 6.02.

A solution of a composition containing the polymer and cetyl pyridinium chloride was prepared by taking 2.5 ml of the 10% solution of poly(methyl vinyl ether-alt-maleic acid), sodium salt, adding 17.5 ml of water, and then adding slowly with stirring 5 ml of a 5% w/w solution of cetyl pyridinium chloride in water. A white precipitate formed which re-dissolved in a few minutes, to give a solution which comprised approximately 1% poly(methyl vinyl ether-alt-maleic acid) and 1% cetyl pyridinium chloride.

To 3 g of Syton™ W50 (a 50% by weight aqueous colloidal dispersion of silica, supplied by Du Pont) was added with stirring 3 ml of water and then 3 ml of the solution of the complex of the polymer and cetyl pyridinium chloride. The mixture was stirred and then coated on polyethylene terephthalate photographic film support using a doctor blade positioned 150 micrometers above the surface of the film support. The coating was allowed to dry and was seen to be glossy and substantially clear.

The laydown of the coating was determined by weighing a measured area of coating, then removing the coated layer by abrasion and re-weighing the sample, and was found to be 50 g per square meter of silica.

Samples of the comparative coating of Example 1 and of the coating according to the invention of Example 2 were printed with a test pattern using a Hewlett Packard Deskjet™ 850 C inkjet printer. On emerging from the printer, the matte comparative coating of Example 1 still had liquid ink lying on the surface, while the coating of the invention, Example 2, had a glossy colourful print which was dry to the touch.

Both samples were left until the comparative coating of Example 1 was dry, then a strip was cut from each and held under running cold water for one minute. The image was almost entirely washed out of comparative Example 1, while the image in the coating of Example 2 remained virtually unchanged, showing strong binding of the image dyes by the layer of the invention.

EXAMPLE 3

In this Example, solutions and coatings were made as in Example 2, but the ratios of the components were varied. Testing was as in Example 2.

Coating 3A
  A coating fluid was prepared by mixing together
  3 g of SytonW50
  4 ml of water, and
  2 ml of a solution comprising 1% poly(methyl vinyl ether-alt-maleic acid), sodium salt, and 1% cetyl pyridinium chloride.
  The fluid was applied as a coating and tested as in Example 2, to produce a colourful glossy print which was essentially transparent when viewed by transmitted light (i.e. holding up to the light).

Coating 3B
  A coating fluid was prepared by mixing together
  3 g of SytonW50
  4 ml of water, and
  2 ml of a solution comprising 2% poly(methyl vinyl ether-alt-maleic acid), sodium salt, and 1% cetyl pyridinium chloride.
  The fluid was applied as a coating and tested as in Example 2, to produce a colourful glossy print which was essentially transparent when viewed by transmitted light.

Coating 3C
  A coating fluid was prepared by mixing together
  3 g of SytonW50
  1 ml of water, and
  5 ml of a solution comprising 2% poly(methyl vinyl ether-alt-maleic acid), sodium salt, and 1% cetyl pyridinium chloride.
  The fluid rapidly thickened and gelled, to give a less satisfactory coating which had a satin rather than a glossy surface.

Coating 3D
  A coating fluid was prepared by mixing together
  3 g of SytonW50
  4 ml of water,
  2 ml of a solution comprising 2% poly(methyl vinyl ether-alt-maleic acid), sodium salt, and 1% cetyl pyridinium chloride, and
  0.2 ml of a 10% solution of poly(methyl vinyl ether-alt-maleic acid)
  The fluid was applied as a coating and tested as in Example 2, and gave similar results to Coating 3B.

Coating 3E
  A coating fluid was prepared by mixing together
  3 g of SytonW50
  4 ml of water,
  2 ml of a solution comprising 2% poly(methyl vinyl ether-alt-maleic acid), sodium salt, and 1% cetyl pyridinium chloride, and 0.4 ml of a 10% solution of poly(methyl vinyl ether-alt-maleic acid)
  The fluid was applied as a coating and tested as in Example 2, and gave similar results to Coating 3D, except the coating was less glossy.

Coating 3F No Cationic Surfactant in this Coating Fluid.
  Not according to the invention, for comparative purposes.
  A coating fluid was prepared by mixing together
  3 g of SytonW50
  4.2 ml of water, and
  0.3 ml of a 10% solution of poly(methyl vinyl ether-alt-maleic acid), sodium salt,
  The fluid was applied as a coating and tested as in Example 2, and gave a matte, opaque white coating which showed sideways spread of the ink. When held under running water, the image almost entirely washed out.

Coating 3G Not According to the Invention: for Comparative Purposes.
  There was no maleic acid-containing polymer in this coating fluid.
  A coating fluid was prepared by mixing together
  3 g of SytonW50
  4 ml of water, and
  2 ml of a 1% solution of cetyl pyridinium chloride.
  The result was a coagulated precipitate which could not be coated.

EXAMPLE 4

This example illustrates the use of further maleic acid polymers and further surfactants. Solutions and coatings were made as described in Example 2.

Coating 4A
  A coating fluid was prepared by mixing together
  5 g of SytonW50
  5 ml of water, and
  5 ml of a solution comprising 1% poly(acrylic acid-co-maleic acid), sodium salt, and 0.3% cetyl pyridinium chloride. (The poly(acrylic acid-co-maleic acid), sodium salt was supplied by Aldrich Chemical Company Inc, and had an average molecular weight of about 50,000).

The fluid was applied as a coating and tested as in Example 2, to produce a colourful glossy print which was essentially transparent when viewed by transmitted light.

Coating 4B

A coating fluid was prepared by mixing together 2 g of SytonW50

2 ml of water, and 3 ml of a solution comprising 2% poly(styrene-alt-maleic acid), sodium salt, and 1% cetyl pyridinium chloride. (The poly(styrene-alt-maleic acid), sodium salt was supplied by Aldrich Chemical Company Inc, and had an average molecular weight of about 120,000).

The fluid was applied as a coating and tested as in Example 2, to produce a colourful glossy print which was essentially transparent when viewed by transmitted light.

Coating 4C

A coating fluid was prepared by mixing together 2 g of SytonW50

2 ml of water, and 2 ml of a solution comprising 1% poly(methyl vinyl ether-alt-maleic acid),sodium salt, and 1% cetyl trimethyl ammonium bromide.

The fluid was applied as a coating and tested as in Example 2, to produce a colourful glossy print which was essentially transparent when viewed by transmitted light.

Coating 4D

A coating fluid was prepared by mixing together 3 g of SytonW50

3 ml of water, and 1.5 ml of a solution comprising 1% poly(methyl vinyl ether-alt-maleic acid),sodium salt, and 1.3% benzyl tributyl ammonium chloride.

The fluid was applied as a coating and tested as in Example 2. A white, opaque coating with a matte surface resulted, which gave a bright colourful print which remained after washing under running water.

Coating 4E

A coating fluid was prepared by mixing together 3 g of SytonW50

4 ml of water, and 2 ml of a solution comprising 2% poly(methyl vinyl ether-alt-maleic acid), sodium salt, and 1% benzyl tributyl ammonium chloride and 1% cetyl pyridinium chloride.

The fluid was applied as a coating and tested as in Example 2, to produce a colourful glossy print which was essentially transparent when viewed by transmitted light.

EXAMPLE 5

This example illustrates the use of other grades of silica. The Syton W50 used in the foregoing examples was supplied by Du Pont and was a 50 wt % colloidal dispersion of silica having a polydisperse particle size distribution, the mean particle diameter being of the order of 50 nm. The Ludox TM50 used in this example was supplied by DuPont and was a 50 wt % colloidal dispersion of silica having a monodisperse particle size distribution, the mean particle diameter being of the order of 50 nm.

The Sylojet 703A used in this example was supplied by Grace Davison and was a 20 wt % dispersion of silica gel having a polydisperse particle size distribution, the mean particle diameter being of the order of 1 micrometer. The silica particles were themselves micro-porous, unlike those of the Syton or Ludox samples.

All the silica dispersions used in these examples bore a negative surface charge, that is were anionic in nature.

Coating 5A

A coating fluid was prepared by mixing together 2 g of Ludox TM50

5 ml of water, and 1 ml of a solution comprising 1% poly(methyl vinyl ether-alt-maleic acid), sodium salt, and 1% cetyl pyridinium chloride.

The fluid was applied as a coating and tested as in Example 2, to produce a colourful glossy print which was essentially transparent when viewed by transmitted light. The coating was more brittle than similar coatings made using Syton W50.

Coating 5B

A coating fluid was prepared by mixing together 5 g of Sylojet 703A, and 3 ml of a solution comprising 2% poly(methyl vinyl ether-alt-maleic acid),sodium salt, and 1% cetyl pyridinium chloride.

The fluid was applied as a coating and tested as in Example 2, to give a translucent semi-gloss coating which was brittle and produced an acceptable colour print.

Coating 5C

A coating fluid was prepared by mixing together 1.5 g of SytonW50, 3 g of Sylojet 703A, 3 ml of water, and 2 ml of a solution comprising 2% poly(methyl vinyl ether-alt-maleic acid),sodium salt, and 1% cetyl pyridinium chloride.

The fluid was applied as a coating and tested as in Example 2, to produce a colourful semi-glossy print which was moderately transparent when viewed by transmitted light. The coating appeared very dry in the ink-bearing areas immediately after printing.

EXAMPLE 6

This example illustrates the inclusion of a cationic polymer in a maleic acid polymer complex, which was produced in analogous fashion to the composition described in Example 2, by slowly adding a dilute aqueous solution of polyethylene imine to a stirred dilute solution of poly (methyl vinyl ether-alt-maleic acid), sodium salt, and stirring until the initial precipitate is re-dissolved.

A coating fluid was prepared by mixing together 3 g of Syton W50

4 ml of water, 1.5 ml of a solution comprising 2% poly(methyl vinyl ether-alt-maleic acid),sodium salt, and 1% Lupasol WF, and 0.5 ml of a solution comprising 2% poly(methyl vinyl ether-alt-maleic acid), sodium salt, and 1% cetyl pyridinium chloride.

(Lupasol WF was a polyethylene imine, average molecular weight 25,000, supplied by BASF).

The fluid was applied as a coating and tested as in Example 2, to produce a colourful glossy print which was essentially transparent when viewed by transmitted light. The coating appeared less brittle than comparable coatings which did not contain polyethylene imine.

EXAMPLE 7

This example illustrates the preparation of a silica layer according to the invention coated in association with a gelatin layer on a polyethylene coated paper support.

Solution A was prepared by mixing 94 g of water with 86 g of a solution comprising 2% poly(methyl vinyl ether-alt-maleic acid), sodium salt, and 1% cetyl pyridinium chloride.

Dispersion A was prepared by mixing 65 g of water with 115 g of Syton W50.

Solution A and Dispersion A were mixed together and immediately applied as a coating with a slide-hopper experimental coating machine at a wet laydown of 100 ml per square meter onto the support, and the coating was then dried, to give a coated laydown of about 16 g/m$^2$ of silica.

The support comprised polyethylene-coated photographic paper base which had previously been coated with 3 g per square meter of gelatin.

The result was a glossy white coating which produced brightly coloured prints of excellent quality when printed on an HP Deskjet 970Cxi inkjet printer.

EXAMPLE 8

A dispersion or slurry of aluminium oxide was prepared by ball-milling 10 g of alumina (Brockman type 1, neutral pH, 100–25 mesh supplied by Fisons Scientific Equipment), 0.1 g of sodium carbonate and 40 g of water for several hours.

To 5 g of this dispersion was added 2 ml of a solution comprising 2% poly(methyl vinyl ether-alt-maleic acid), sodium salt, and 1% cetyl pyridinium chloride. The mixture was stirred and then applied as a coating on polyethylene terephthalate photographic film support using a doctor blade positioned 150 micrometers above the surface of the film support. The coating was allowed to dry whereupon it formed a white matte layer on the support.

A sample of the coating was printed with a test pattern using a Hewlett Packard Deskjet (Registered trade Mark) 850C printer. A satisfactory coloured image resulted.

The coating fluids described in the above Examples have the advantage that unlike conventional coating fluids no polymer binder is required. Further the use of anionic silica gives an economic advantage over the prior art which uses a cationic silica.

What is claimed is:

1. A coating fluid for forming a coating on a support for use in printing said fluid comprising an aqueous liquid having dispersed therein
   (a) from 2 to 50% of an anionic inorganic oxide selected from aluminium oxide and silica the % being by weight based on the combined weight of aqueous liquid and inorganic oxide and
   (b) from 1 to 50% by weight based on the weight of oxide (a) of a composition comprising a polymer containing negatively charged groups and a cationic surfactant.

2. A coating fluid as claimed in claim 1 wherein the composition is formed from a polymer containing maleic acid units and a surfactant containing a quaternary nitrogen atom.

3. A coating fluid as claimed in claim 2 wherein the polymer is a copolymer obtained by copolymerising a maleic acid containing monomer with another ethylenically unsaturated monomer or monomers and where the molar ratio of maleic acid containing monomers to other monomers is from 1:1 to 1:5.

4. A coating fluid as claimed in claim 1 wherein the relative amounts of anionic polymer to cationic surfactant is sufficient to maintain the composition in solution or, in the case where a precipitate is formed, to redissolve the precipitate.

5. A coating fluid as claimed in claim 4 wherein the molar ratio of cationic surfactant to maleate ion units is from 2:100 to 1:1.

6. An ink jet recording sheet comprising a support and an ink jet receiving layer on at least one side of the support wherein the ink jet receiving layer comprises a coating obtained from a coating fluid comprising an aqueous liquid having dispersed therein
   (a) from 2 to 50% of an anionic inorganic oxide selected from aluminium oxide and silica the % being by weight based on the combined weight of aqueous liquid and inorganic oxide and
   (b) from 1 to 50% by weight based on the weight of oxide (a) of a composition comprising a polymer containing negatively charged groups and a cationic surfactant.

7. An ink jet recording sheet as claimed in claim 6 wherein the composition is formed from a polymer containing maleic acid units and a surfactant containing a quaternary nitrogen atom.

8. An ink jet recording sheet as claimed in claim 7 wherein the polymer is a copolymer obtained by copolymerising a maleic acid containing monomer with another ethylenically unsaturated monomer or monomers and where the molar ratio of maleic acid containing monomers to other monomers is from 1:1 to 1:5.

9. An ink jet recording sheet as claimed in claim 6 wherein the relative amounts of anionic polymer to cationic surfactant is sufficient to maintain the composition in solution or, in the case where a precipitate is formed, to redissolve the precipitate.

10. An ink jet recording sheet as claimed in claim 9 wherein the molar ratio of cationic surfactant to maleate ion units is from 2:100 to 1:1.

* * * * *